(12) United States Patent
Silverman et al.

(10) Patent No.: US 11,644,525 B2
(45) Date of Patent: May 9, 2023

(54) LOCATION ACCURACY AUGMENTATION METHOD WITH ULTRA WIDEBAND

(71) Applicant: Cisco Technology, Inc., San Jose, CA (US)

(72) Inventors: Matthew Aaron Silverman, Shaker Heights, OH (US); Jerome Henry, Pittsboro, NC (US); Robert Edgar Barton, Richmond (CA); Sivadeep R. Kalavakuru, Copley, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 247 days.

(21) Appl. No.: 17/089,119

(22) Filed: Nov. 4, 2020

(65) Prior Publication Data

US 2022/0137176 A1 May 5, 2022

(51) Int. Cl.
*G01S 5/02* (2010.01)
*H04B 17/318* (2015.01)
(Continued)

(52) U.S. Cl.
CPC .......... *G01S 5/0249* (2020.05); *G01S 5/0036* (2013.01); *G01S 5/0244* (2020.05); *H04B 17/318* (2015.01); *H04W 4/80* (2018.02)

(58) Field of Classification Search
CPC .... G01S 5/0249; G01S 5/0036; G01S 5/0244; G01S 5/021; G01S 5/0263; H04B 17/318; H04B 17/391; H04B 17/21; H04W 4/80
See application file for complete search history.

(56) References Cited

U.S. PATENT DOCUMENTS

| | | | |
|---|---|---|---|
| 6,941,110 B2 | 9/2005 | Kloper et al. | |
| 8,515,411 B2 | 8/2013 | Sarkar et al. | |

(Continued)

FOREIGN PATENT DOCUMENTS

| | | |
|---|---|---|
| CN | 109348409 A | 2/2019 |
| CN | 105430767 B | 4/2019 |

(Continued)

OTHER PUBLICATIONS

El-Kamchouchi et al., "Towards a Precise Direction of Arrival Estimation for Coherent Sources Using EC-Music", Journal of Electrical and Electronic Engineering, vol. 4, Issue 2, http://article.sciencepublishinggroup.com/html/10.11648.j.jeee.20160402.17.html, Apr. 2016, 4 pages.

(Continued)

*Primary Examiner* — Farid Seyedvosoghi
(74) *Attorney, Agent, or Firm* — Edell, Shapiro & Finnan, LLC

(57) ABSTRACT

A location server collects from access points at known locations in a venue, which is represented by grid locations defined by parameters accessible to the location server, (i) ultra wideband (UWB) location measurements for a UWB location technology based on UWB transmissions from mobile devices in the venue, and (ii) non-UWB location measurements for non-UWB location technologies based on non-UWB transmissions from the mobile devices. The location server associates the non-UWB location measurements for the non-UWB location technologies with the grid locations, using the UWB location measurements as reference measurements. The location server populates location calibration records for the grid locations of the venue with the non-UWB location measurements associated with the grid locations. The location server calibrates the non-UWB location technologies at the grid locations based on the non- (Continued)

UWB location measurements in the location calibration records associated with the grid locations.

20 Claims, 10 Drawing Sheets

(51) Int. Cl.
*H04W 4/80* (2018.01)
*G01S 5/00* (2006.01)

(56) References Cited

U.S. PATENT DOCUMENTS

| | | | |
|---|---|---|---|
| 8,559,887 | B2 | 10/2013 | Stager et al. |
| 8,776,221 | B2 | 7/2014 | Rangarajan et al. |
| 9,763,216 | B2 | 9/2017 | Sayeed |
| 9,823,330 | B2 | 11/2017 | Hart et al. |
| 9,949,083 | B1 | 4/2018 | Kirby et al. |
| 9,998,856 | B2 | 6/2018 | Edge |
| 10,064,012 | B1 | 8/2018 | Boston et al. |
| 11,246,010 | B2 | 2/2022 | Mao et al. |
| 11,271,943 | B2 | 3/2022 | Urabe et al. |
| 2005/0085190 | A1 | 4/2005 | Nishikawa |
| 2008/0101296 | A1 | 5/2008 | Palin et al. |
| 2008/0186231 | A1* | 8/2008 | Aljadeff ............... G01S 5/0257 342/387 |
| 2009/0311960 | A1 | 12/2009 | Farahani et al. |
| 2010/0271263 | A1 | 10/2010 | Moshfeghi |
| 2013/0138314 | A1 | 5/2013 | Vittala et al. |
| 2014/0152437 | A1 | 6/2014 | Tian et al. |
| 2015/0156637 | A1 | 6/2015 | Li et al. |
| 2015/0289099 | A1 | 10/2015 | Marano et al. |
| 2015/0378002 | A1 | 12/2015 | Hughes et al. |
| 2016/0178727 | A1 | 6/2016 | Bottazzi |
| 2016/0212579 | A1 | 7/2016 | Duan et al. |
| 2017/0003374 | A1 | 1/2017 | Hehn et al. |
| 2017/0082727 | A1 | 3/2017 | Sendonaris et al. |
| 2017/0123039 | A1 | 5/2017 | Shin et al. |
| 2017/0123045 | A1 | 5/2017 | Shin et al. |
| 2017/0280281 | A1 | 9/2017 | Pandey et al. |
| 2017/0356979 | A1 | 12/2017 | Georgiou et al. |
| 2018/0310272 | A1 | 10/2018 | Younis |
| 2019/0033423 | A1 | 1/2019 | Moslifeghi |
| 2019/0110227 | A1 | 4/2019 | Lepp et al. |
| 2019/0166574 | A1 | 5/2019 | Abou-Rizk et al. |
| 2019/0195981 | A1 | 6/2019 | Ding et al. |
| 2019/0252064 | A1 | 8/2019 | Pipher et al. |
| 2019/0349709 | A1 | 11/2019 | Kim et al. |
| 2019/0387374 | A1 | 12/2019 | Gherardi et al. |
| 2020/0014526 | A1 | 1/2020 | Hammerschmidt et al. |
| 2020/0037113 | A1 | 1/2020 | Tyagi et al. |
| 2020/0041601 | A1 | 2/2020 | Ko et al. |
| 2020/0137676 | A1 | 4/2020 | Yoon et al. |
| 2020/0178036 | A1 | 6/2020 | Edge |
| 2020/0209341 | A1 | 7/2020 | Ylamurto et al. |
| 2020/0228943 | A1 | 7/2020 | Martin et al. |
| 2020/0314681 | A1 | 10/2020 | Kuo et al. |
| 2021/0352434 | A1 | 11/2021 | Harvey et al. |
| 2021/0400441 | A1 | 12/2021 | Burowski et al. |

FOREIGN PATENT DOCUMENTS

| | | | | |
|---|---|---|---|---|
| CN | 110730422 | A | 1/2020 | |
| CN | 210042235 | U | 2/2020 | |
| DE | 102017116327 | A1 * | 1/2019 | ............... G01S 5/00 |
| EP | 3680687 | A1 * | 7/2020 | ........... G01S 1/0428 |
| WO | 2015078327 | A1 | 6/2015 | |
| WO | 2017091792 | A | 6/2017 | |
| WO | 2019067105 | A1 | 4/2019 | |
| WO | 2022025693 | A1 | 2/2022 | |

OTHER PUBLICATIONS

Xiaojie Zhao et al., "Does BTLE measure up against WiFi? A comparison of indoor location performance", VDE Verlag GMBH, Berlin, Offenbach, Germany, ISBN 978-3-8007-3621-8, European Wireless 2014, 6 pages.

Qiang Xu et al., "Device Fingerprinting in Wireless Networks: Challenges and Opportunities", IEEE Communications Surveys & Tutorials, vol. 18, No. 1, Draft dated Jan. 8, 2015, 22 pages.

"IEEE Standard for Low-Rate Wireless Networks—Amendment 1: Enhanced Ultra Wideband (UWB) Physical Layers (PHYs) and Associated Ranging Techniques," IEEE Standards Association, IEEE Std 802.15.4z™—2020, Aug. 25, 2020, 174 pages.

"IEEE Standard for Information technology—Telecommunications and information exchange between systems—Local and metropolitan area networks—Specific requirements—Part 15.4: Wireless Medium Access Control (MAC) and Physical Layer (PHY) Specifications for Low-Rate Wireless Personal Area Networks (WPANs)—Amendment 1: Add Alternate PHYs," IEEE, IEEE Std 802.15. 4a™—2007, Aug. 31, 2007, 203 pages.

Harnesswalla, Taha, "IEEE 802.15.4a—Understanding the protocol and Reducing Multi-User Interference", https://scholar.colorado.edu/concern/graduate_thesis_or_dissertations/pv63g062v, Apr. 9, 2013, 80 pages.

Sang, Cung Lian et al., "Numerical and Experimental Evaluation of Error Estimation for Two-Way Ranging Methods", https://www.ncbi.nlm.nih.gov/pmc/articles/PMC6387385/, Feb. 1, 2019, 28 pages.

Michael Stocker, BSc, "Design of a Decentralized and Synchronous UWB-based Localization System", Graz University of Technology (TU Graz), May 2018, 111 pages.

Paul Cheong, et al., "An Energy-Efficient Positioning-Enabled MAC Protocol (PMAC) for UWB Sensor Networks," Proceedings of IST mobile and wireless communications summit, 2005, 6 pages.

\* cited by examiner

LOCATION ACCURACY AUGMENTATION METHOD WITH ULTRA WIDEBAND

TECHNICAL FIELD

The present disclosure relates to network equipment and location services.

BACKGROUND

Location solutions for determining locations of mobile devices located in a specific area or venue based on wireless transmissions from the mobile devices are difficult to calibrate. Conventional calibration techniques rely on time-consuming manual data gathering and are prone to error. Moreover, the location solutions typically rely on many different types of location measurements associated with many different types of location technologies and their associated wireless transmissions. For example, the location measurements may include received signal strength indicator (RSSI), time-of-flight (ToF), two-way ranging (TWR), and angle-of-arrival (AoA) measurements for WiFi, Bluetooth™ low energy (BLE), and ultra-wideband (UWB) technologies. This presents numerous combinations of the different location measurements and the location technologies, which add further complexity to calibration of the location solutions.

DESCRIPTION OF EXAMPLE EMBODIMENTS

Overview

Figure 1:
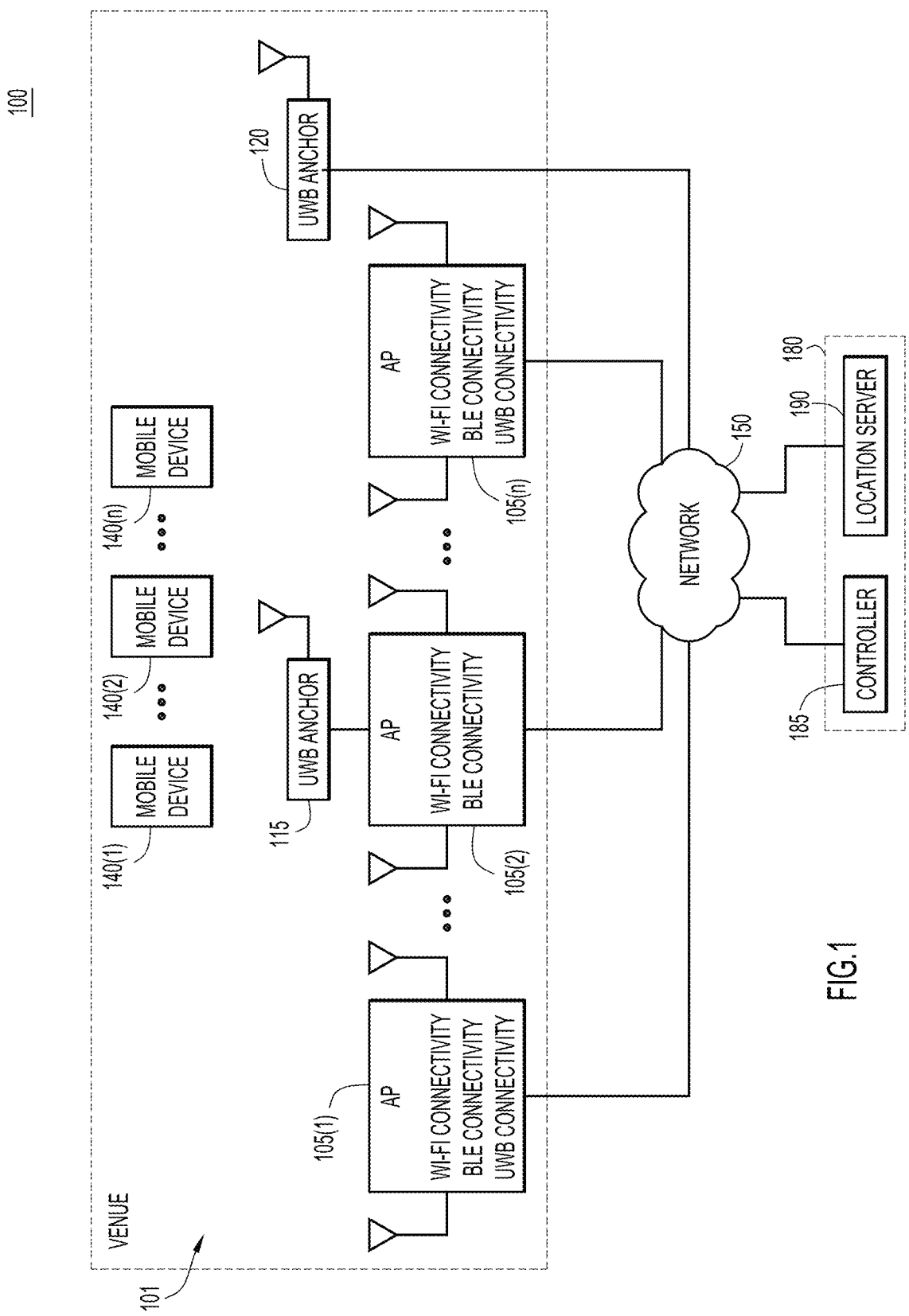
FIG. 1 is a block diagram of a system for automatically calibrating non-UWB location technologies in a venue based on a UWB location technology, according to an example embodiment.

A location server performs a method that includes collecting, from access points at known locations in a venue that is represented by grid locations defined by parameters accessible to the location server, (i) ultra wideband (UWB) location measurements for a UWB location technology based on UWB transmissions from mobile devices in the venue, and (ii) non-UWB location measurements for non-UWB location technologies based on non-UWB transmissions from the mobile devices. The method further includes associating the non-UWB location measurements for the non-UWB location technologies with the grid locations, using the UWB location measurements as reference measurements. The method also includes populating location calibration records for the grid locations of the venue with the non-UWB location measurements associated with the grid locations. The method includes calibrating the non-UWB location technologies at the grid locations based on the non-UWB location measurements in the location calibration records associated with the grid locations.

EXAMPLE EMBODIMENTS

Embodiments presented herein are directed to automated calibration of location technologies in a specific venue. The automated calibration calibrates relatively less accurate location technologies using a relatively more accurate location technology, such as UWB location. The automated calibration leverages (i) a UWB environment or ecosystem that includes UWB-capable mobile devices, and (ii) a tight coupling between UWB, BLE, and WiFi technologies on wireless access points (APs) that communicate with the mobile devices. More specifically, the automated calibration complements mid-to-low accuracy location technologies (e.g., BLE and WiFi location technologies) with high accuracy UWB location measurements to calibrate, and thus improve the accuracy of, the mid-to-low accuracy location technologies in a venue. Once the mid-to-low accuracy technologies are calibrated, when mobile devices that are not equipped with UWB technology (i.e., non-UWB mobile devices) enter the venue, their locations may be determined with improved accuracy using the mid-to-low accuracy location technologies, as calibrated.

Initially, the automated calibration collects and records high-reliability/accuracy UWB location (e.g., ranging) measurements for mobile devices in the venue. The UWB location measurements provide a snapshot of range "ground truth" corresponding to (e.g., snapped-to) predetermined grid locations in the venue. The automated calibration also collects a large (i.e., statistically significant) number of non-UWB location measurements for the mobile devices in the venue. The non-UWB location measurements are associated with non-UWB location technologies, such as WiFi and BLE location technologies, that are less accurate than the UWB location measurements. Then, the automated calibration uses the UWB ground truth as a basis for calibrating the non-UWB technologies at the grid locations over large sets of the UWB and non-UWB location measurements.

Example features of the automated calibration include, but are not limited to, the following:

a. The automated calibration automatically calibrates RSSI location and RSSI fingerprinting for WiFi and BLE at many grid locations across a venue, which substantially eliminates time consuming manual calibration, and improves RSSI location/RSSI fingerprinting performance.

b. The automated calibration may automatically identify and locate multipath reflectors and their locations in the venue.

c. The automated calibration may automatically identify and locate obstacles in the venue. This is achieved when the automated calibration calibrates RSSI location and RSSI fingerprinting, as mentioned above. For AoA or ToF location technologies, the automated calibration identifies locations that yield poor AoA or ToF estimates to certain APs due to significant obstructions.

d. The automated calibration provides/determines per-location technology calibration in the venue, including, but not limited to: overall WiFi AoA error covariance and variance; overall WiFi 2/5 GHz RSSI error covariance and variance; overall BLE AoA; overall BLE RSSI error covariance and variance; overall WiFi fine time measurement (FTM) round trip time (RTT) error covariance and variance; and the like.

e. The automated calibration may also perform the above-listed per-location location technology calibration on a per-mobile device basis.

With reference to FIG. 1, an example system 100 for automatically calibrating non-UWB location technologies used in a physical space 101, based on a UWB location technology. The location technologies include, but are not limited to, location technologies that employ or rely on RSSI (based on pathloss models), RSSI fingerprinting, ToF, TWR, fine time measurement (FTM) round trip time (RTT), time-difference-of-arrival (TDoA), AoA, and the like, to form location solutions with respect to mobile devices based on wireless transmissions from the mobile devices. System 100 includes wireless access points 105 deployed in space 101 (referred to in the ensuing description as a "venue 101") and configured to communicate with a plurality of mobile devices 140 in the venue via different wireless communication technologies. The venue 101 may support any density of mobile devices 140, and may include any indoor or outdoor area, such as a home, school, campus, office building, conference center, stadium, or other venue or location or portion thereof. Each of the access points 105 can include any access point or other network device configured to facilitate a connection between one or more mobile devices (such as mobile devices 140) and a network (such as network 150). Access points are sometimes referred to herein as "APs" or "WLAN access points."

Access points 105 are positioned at known locations in venue 101, and can communicate with (i.e., send transmissions to, and/or receive transmission from) one or more of the mobile devices 140 using a relatively short-range wireless local area communication technology, such as (but not limited to) Wi-Fi WLAN, BLE, and/or UWB. For example, access points 105(1) and 105(n) include built-in/integrated Wi-Fi connectivity for communicating with one or more of the mobile devices 140 over Wi-Fi WLAN, BLE connectivity for communicating with one or more of the mobile devices 140 over BLE, and UWB connectivity for communicating with one or more of the mobile devices 140 over UWB. Accordingly, with respect to mobile devices 140, access points 105(1) and 105(n) can make location measurements for UWB, WiFi, and BLE location technologies based on UWB, WiFi, and BLE transmissions from the mobile devices, respectively. For example, the access points can make RSSI, ToF, TWR, TDoA, and AoA location measurements with respect to mobile devices 140 for each of the UWB, WiFi, and BLE location technologies. The embodiments presented herein are described primarily with reference to BLE as the Bluetooth technology by way of example only. It is understood that any other Bluetooth technology, or combination of Bluetooth technologies, may be used with the embodiments.

Access point 105(2) includes built-in/integrated Wi-Fi connectivity and BLE connectivity but not UWB connectivity. Thus, access point 105(2) can make WiFi and BLE location measurements, but not UWB location measurements. However, access point 105(2) is configured to achieve UWB connectivity via a separate, peripheral UWB anchor device 115 connected to access point 105(2), and positioned at a known location in venue 101. For example, the UWB anchor device 115 can be embodied in a peripheral device connected to access point 105(2) via a universal serial bus (USB) dongle, a time-synchronized network (TSN) connection, or another connection technology now known or hereinafter developed. UWB anchor device 115 can make UWB location measurements and provide them to access point 105(2).

Each of the mobile devices 140 can include any mobile device or other object capable of over-the-air RF communications utilizing wireless local area communication technologies such as (but not limited to) Wi-Fi WLAN, BLE, and UWB. Each of the mobile devices 140 also may be capable of over-the-air RF communications utilizing one or more wireless wide area communication technologies such as Third Generation Partnership Project (3GPP) communication technologies (e.g., Fourth Generation (4G)/Long Term Evolution (LTE), Fifth Generation (5G), etc.). For example, each of the mobile devices 140 can include a mobile wireless phone, computer, tablet, smart glasses, Augmented Reality tool, an electronic tag (which may, e.g., be coupled to, or associated with, an electronic or non-electronic object), or another device or object now known or hereinafter developed. A mobile device is sometimes referred to herein as a "client" or "station" (STA).

Each of the mobile devices 140 is configured to communicate with one or more of the access points 105. For example, each of the mobile devices 140 may include Wi-Fi WLAN connectivity for communicating with one or more of the access points 105 over Wi-Fi WLAN, BLE connectivity for communicating with one or more of the access points 105 over BLE, and/or UWB connectivity for communicating with one or more of the access points 105 over UWB (either directly or via a peripheral UWB anchor device 115).

The mobile devices 140 also may be configured to communicate over UWB with one or more standalone UWB anchor devices 120 positioned at known locations in space or venue 101. A standalone UWB anchor device 120 includes functionality for receiving (and potentially also sending and/or processing) UWB transmissions without being connected to, or integrated with, an access point 105. Each standalone UWB anchor device 120 also may include other communication capabilities, such as BLE wireless communication capabilities and/or wired communication capabilities, e.g., via a connection to a network (such as network 150) over IEEE 802.11, Ethernet, or another connection mechanism now known or hereinafter developed.

The terms "UWB anchor" and "anchor" are used interchangeably herein to refer to any device or object configured to detect UWB transmissions from one or more mobile devices (e.g., one or more of the mobile devices 140). For example, a UWB anchor can include a standalone UWB anchor device 120, a peripheral UWB anchor device 115 connected to an access point 105(2), and/or an access point 105(1) with UWB connectivity. As would be appreciated by a person of ordinary skill in the art, while a UWB anchor can include an access point 105, not all UWB anchors include access points 105, and not all access points 105 constitute UWB anchors.

It should be appreciated that the number, type, and arrangement of the access points 105, mobile devices 140, peripheral UWB anchor devices 115, and standalone UWB anchor devices 120, and their respective connectivity configurations and capabilities, are illustrative and can vary in alternative example embodiments.

The access points 105, peripheral UWB anchor device 115, standalone UWB anchor device 120, and mobile devices 140 are configured to communicate with a control device 180 via a network 150. The network 150 includes any communications medium for transmitting information between two or more computing devices. For example, the network 150 can include a local area network (LAN), wide area network (WAN), virtual private network (VPN), Intranet, Internet, hardwire connections, modem connections, wireless connections, or combinations of one or more these items.

The control device 180 includes one or more computing devices, which include a controller 185 and a location server 190. The controller 185 includes hardware and/or software that is configured to manage operation of the access points 105. For example, the controller 185 may be configured to facilitate certain communications involving one or more of the mobile devices 140 through one or more of the access points 105. In one form, the controller 185 and the location server 190 may be separate and physically distinct entities.

The location server 190 includes hardware and/or software that is configured to manage location-related transmissions involving the access points 105, peripheral UWB anchor device 115, standalone UWB anchor device 120, and/or mobile devices 140. For example, the location server 190 can be configured to cooperate with the access points 105, peripheral UWB anchor device 115, standalone UWB anchor device 120, and/or mobile devices 140 to initiate and complete client ranging procedures within the venue 101 that provide location measurements to location solutions, e.g., by assigning and/or instructing one or more of the access points 105, peripheral UWB anchor device 115, and/or standalone UWB anchor device 120 to complete client ranging procedures with respect to one or more of the mobile devices 140.

Location server 190 implements location services that use location measurements that result from the client ranging procedures to compute location solutions for mobile devices. In addition, according to embodiments presented herein, location server 190 manages location-related transmissions (including calibration sessions/exchanges described below) and location measurements that result from the location-related transmissions to automatically calibrate non-UWB location technologies (e.g., WiFi and BLE location technologies) based on a UWB location technology. For example, location server 190 may automate calibration of RSSI, ToF, TWR, FTM RTT, TDoA, and AoA location technologies for WiFi and BLE based on the UWB location technology.

As used herein, the term "non-UWB location technology" refers to a location technology (e.g., RSSI) that is based on non-UWB wireless technology (e.g., WiFi). For example, "WiFi RSSI" is a non-UWB location technology based on RSSI measurements of WiFi transmissions, and "BLE AoA" is a non-UWB location technology based on AoA measurements of BLE transmissions. Similarly, the term "UWB location technology" refers to a location technology (e.g., RSSI) that is based on UWB wireless technology. For example, "UWB RSSI" is a UWB location technology based on RSSI measurements of UWB transmissions. Accordingly, a UWB location technology may be characterized by a tuple <location technology, UWB wireless technology> (e.g., <RSSI, UWB>), while a non-UWB location technology may be characterized by a tuple <location technology, non-UWB wireless technology> (e.g., <AoA, WiFi>).

The location server 190 includes logic for performing location computations based on the location technologies prior to, and after, calibration of the location technologies. For example, the location server 190 can process time, distance, angle, signal strength or other information from one or more of the access points 105, peripheral UWB anchor devices 115, standalone UWB anchor devices 120, and/or mobile devices 140 to determine and/or track a location of a particular one of the mobile devices 140. The location server 190 can be configured to return results of that processing to the particular one of the mobile devices 140, e.g., through one or more of the access points 105, or to some other entity seeking that location information, if so desired. In addition, or in the alternative, the access points 105, peripheral UWB anchor devices 115, standalone anchor devices 120, and/or mobile devices 140 can be configured to perform certain location computations and, potentially, to report results from those computations to the location server 190.

Though illustrated in FIG. 1 as discrete components, and as explained above, it should be appreciated that the controller 185 and location server 190 may be integrated or otherwise reconfigured in any number of different components without departing from the spirit and scope of the embodiments presented herein.

Figure 2:
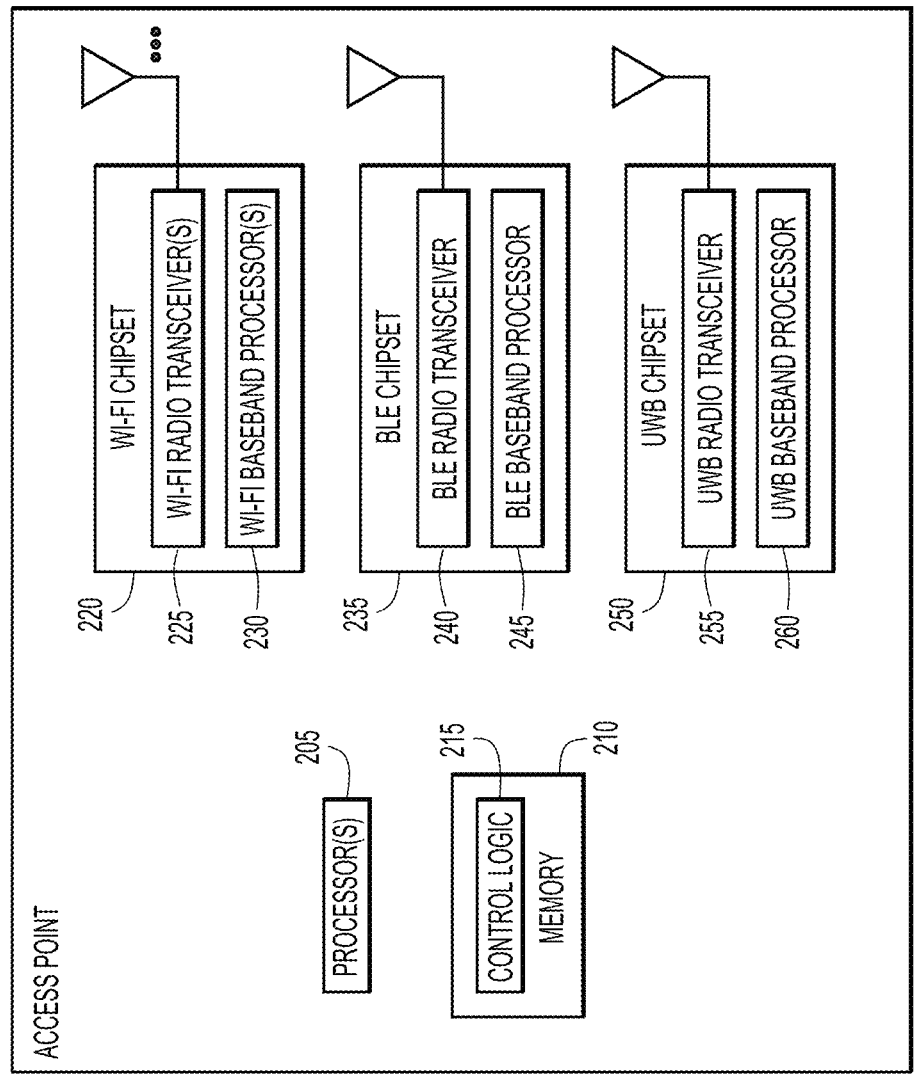
FIG. 2 is a block diagram of an access point of the system, according to an example embodiment.

FIG. 2 is a block diagram of an access point 200, according to an example embodiment. The access point 200 includes a Wi-Fi chipset 220 for providing Wi-Fi connectivity, a BLE chipset 235 for providing BLE connectivity, and a UWB chipset 250 for providing UWB connectivity. The Wi-Fi chipset 220 includes one or more Wi-Fi radio transceivers 225 (e.g., a first non-UWB radio) configured to perform Wi-Fi RF transmission and reception, and one or Wi-Fi baseband processors 230 configured to perform Media Access Control (MAC) and physical layer (PHY) modulation/demodulation processing. The BLE chipset 235 includes a BLE radio transceiver 240 (e.g., a second non-UWB radio) configured to perform BLE RF transmission and reception, and a BLE baseband processor 245 configured to perform BLE baseband modulation and demodulation. The UWB chipset 250 includes a UWB radio transceiver 255 configured to perform UWB RF transmission and reception, and a UWB baseband processor 260 configured to perform UWB baseband modulation and demodulation. For example, the Wi-Fi chipset 220, BLE chipset 235, and UWB chipset 250 may be implemented in one or more application-specific integrated circuits (ASICs), field-programmable gate arrays (FPGAs) or other digital logic embodied in one or more integrated circuits.

The access point 200 includes one or more processors 205, which may embody or include one or more microprocessors and/or microcontrollers. In addition, the access point 200 includes a memory 210 that stores control logic 215. The processor(s) 205 are configured to execute instructions of the control logic 215 to execute various control functions for the access point 200.

As would be understood by a person of ordinary skill in the art, the features and functionality of the access point 200 are illustrative and can vary in alternative example embodiments. For example, the access point 200 may include more, less, or different chipsets in alternative example embodiments. In particular, the access point 200 may not include the Wi-Fi chipset 220 if the access point 200 does not include Wi-Fi connectivity; the access point 200 may not include the BLE chipset 235 if the access point 200 does not include BLE connectivity; and the access point 200 may not include the UWB chipset 250 if the access point 200 does not include UWB connectivity. In addition, as would be recognized by a person of ordinary skill in the art, the access point 200 may include one or more additional components, such as a network interface to provide an IEEE 802.11 connection, Ethernet connection, or other connection, which are not depicted in FIG. 2 for purposes of simplicity.

Figure 3:
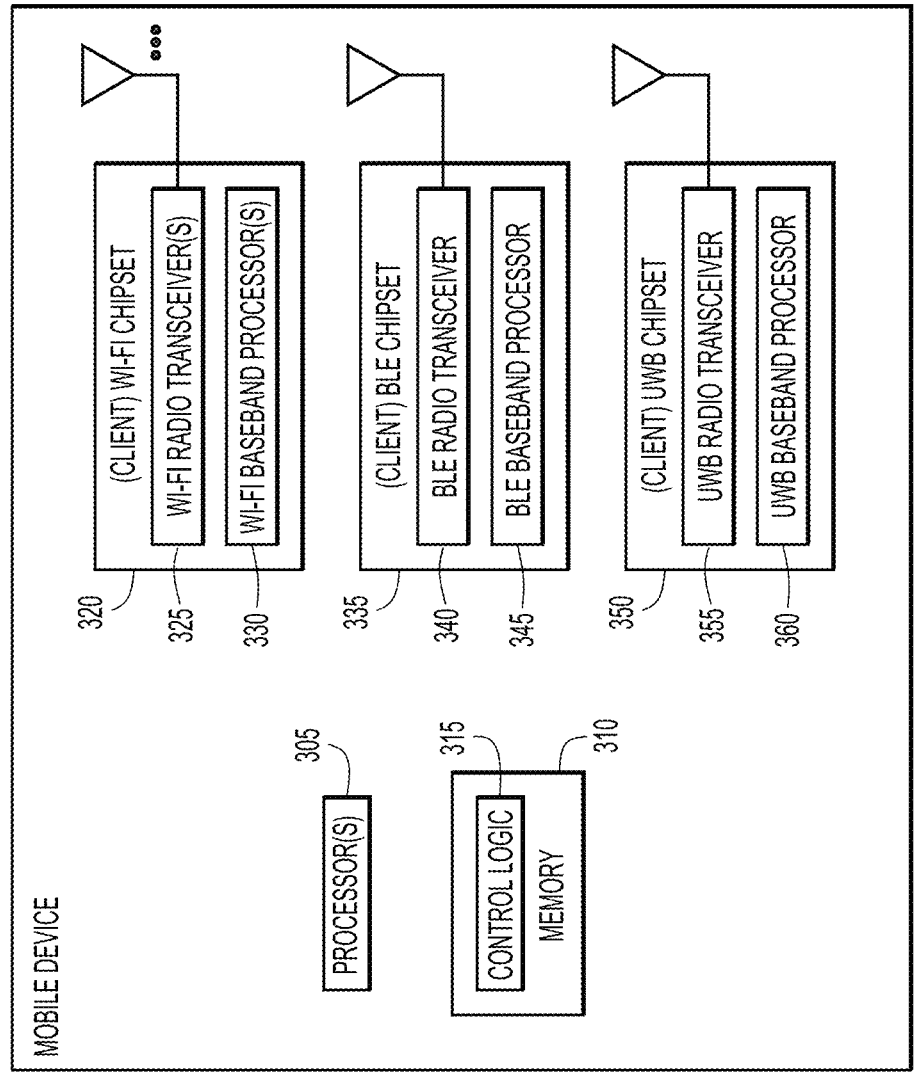
FIG. 3 is a block diagram of a mobile device of the system, according to an example embodiment.

FIG. 3 is a block diagram of a mobile device 300, according to an example embodiment. As would be appreciated by a person of ordinary skill in the art, the mobile device 300 includes chipsets similar to the chipsets of an access point, though with configurations for client-side operations and mobile device/battery-powered use cases. In particular, as with the access point 200 described above in connection with FIG. 2, the mobile device 300 includes a Wi-Fi chipset 320 for providing Wi-Fi connectivity, a BLE chipset 335 for providing BLE connectivity, and a UWB chipset 350 for providing UWB connectivity, with the Wi-Fi chipset 320 including one or more Wi-Fi radio transceivers 325 and one or Wi-Fi baseband processors 330, the BLE chipset 335 including a BLE radio transceiver 340 and a BLE baseband processor 345, and the UWB chipset 350 including a UWB radio transceiver 355 and a UWB baseband processor 360. The mobile device 300 also includes one or more processors 305 (e.g., microprocessor(s) and/or microcontroller(s)) and a memory 310 that stores control logic 315.

As would be understood by a person of ordinary skill in the art, the features and functionality of the mobile device 300 are illustrative and can vary in alternative example embodiments. For example, as with the access point 200 depicted in FIG. 2, the mobile device 300 can include more, less, or different components in alternative example embodiments.

Figure 4:
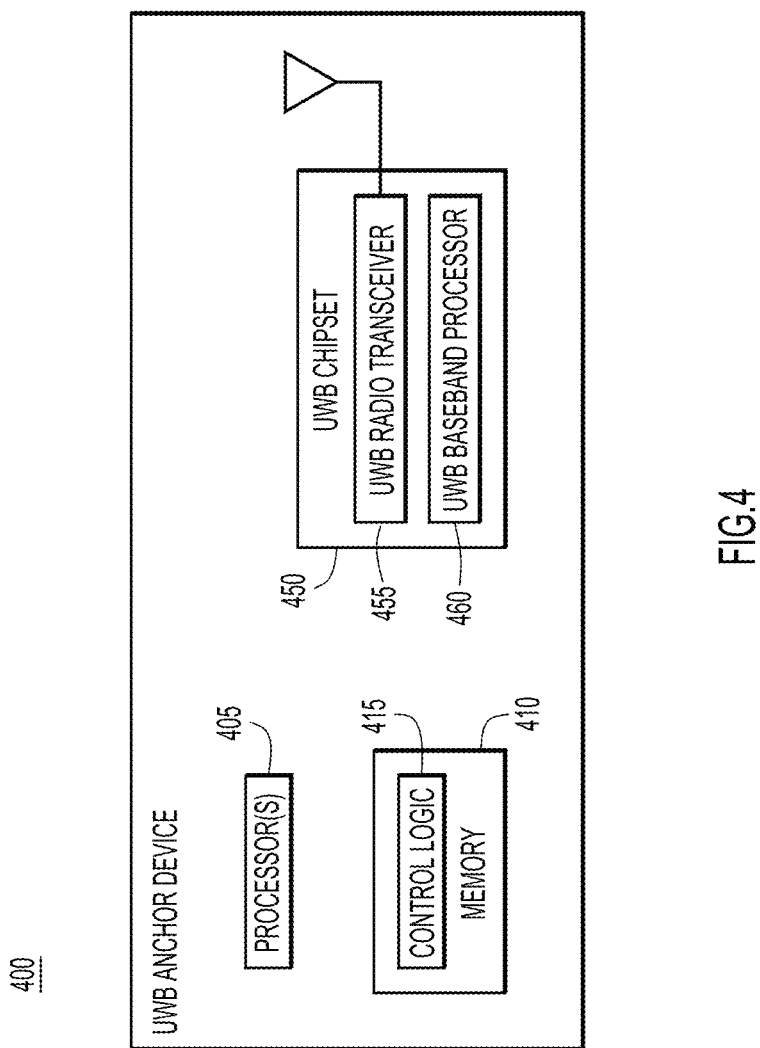
FIG. 4 is a block diagram of a UWB anchor device of the system, according to an example embodiment.

FIG. 4 is a block diagram of a UWB anchor device 400, according to an example embodiment. The UWB anchor device 400 can be, for example, a standalone UWB anchor device or a peripheral UWB anchor device. Accordingly, the UWB anchor device 400 may include some, but not all, of the features depicted in FIGS. 2 and 3 for example access point 200 and mobile device 300, respectively. In particular, while the UWB anchor device 400 includes a UWB chipset 450 (with a UWB radio transceiver 455 and UWB baseband processor 460), as well as one or more processors 405 (e.g., microprocessor(s) and/or microcontroller(s)) and a memory 410 that stores control logic 415, the UWB anchor device 400 does not include a Wi-Fi chipset or BLE chipset.

However, the UWB anchor device 400 may include these features, and/or other features not depicted in FIG. 4, in alternative example embodiments. For example, the UWB anchor device 400 can include additional communication capabilities beyond UWB, such as BLE wireless communication capabilities and/or wired communication capabilities, in alternative example embodiments. In addition, as noted above, the UWB anchor device 400 (or functionality thereof) may be integrated in, or connected to, an access point, such as the access point 200, which may include the same or different components than those depicted in the UWB anchor device 400 of FIG. 4.

Figure 5:
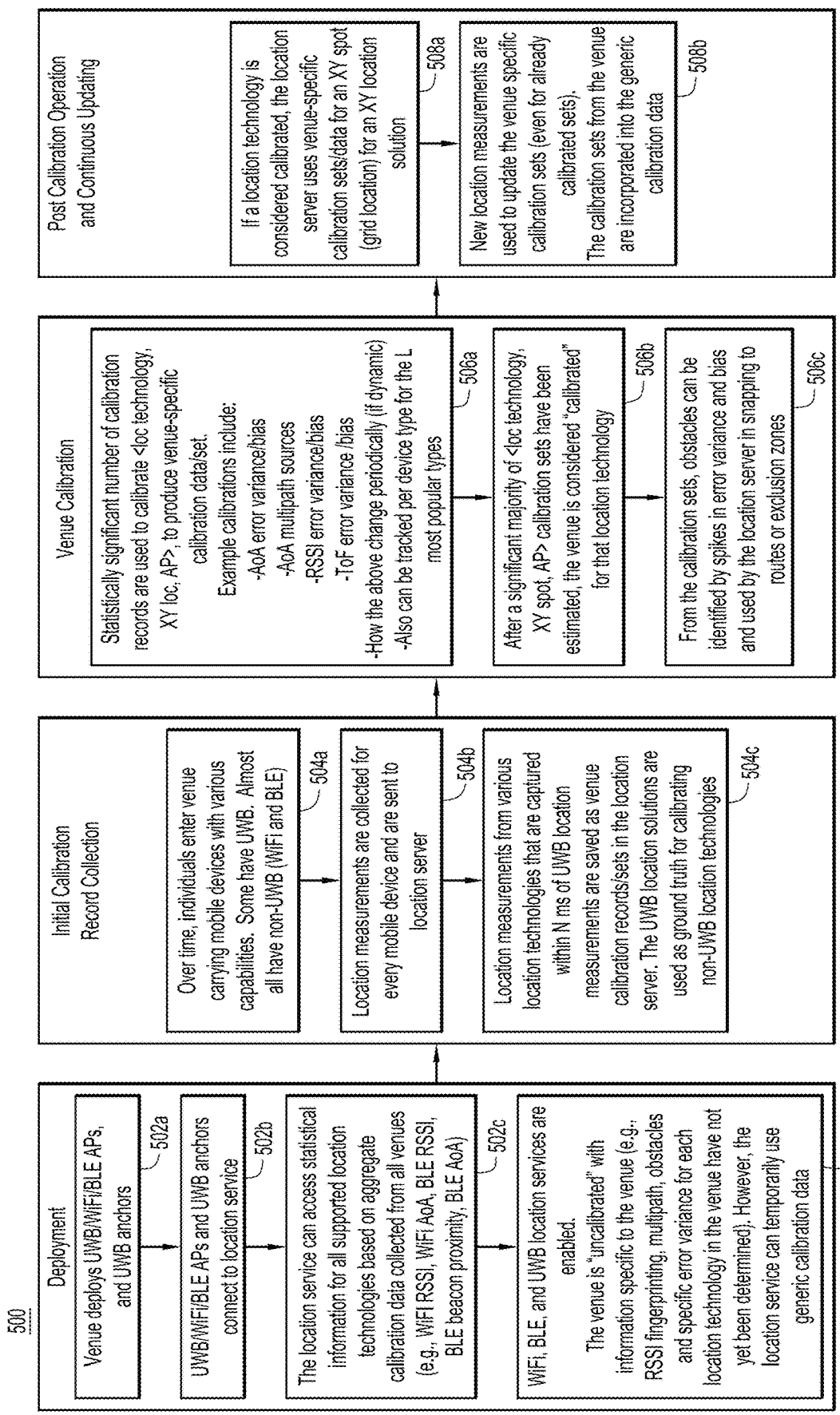
FIG. 5 is a flowchart of a method of automatically calibrating non-UWB location technologies for a venue based on a UWB location technology, according to an example embodiment.

Turning now to FIG. 5, there is shown an example operational flow 500 for automatically calibrating non-UWB location technologies for a venue (e.g., venue 101) based on UWB location technology. Deployment operations 502*a*-502*d* are described first. At 502*a*, APs (e.g., APs 105 and UWB anchor devices 115, 120) are deployed at known locations throughout the venue. Identifiers of the APs and the UWB anchors (e.g., MAC addresses and/or other identifiers) mapped to the corresponding known locations of the APs and the UWB anchors are stored in a location database accessible to location server 190. Information indicating a predetermined set of grid locations representative of the venue are also stored in the location database and accessible to location server 190. That is, the venue may be considered as being represented by the grid locations. The grid locations may represent locations on a floor map of the venue, for example. The grid locations may be regularly spaced-apart from each other to form a grid pattern. Alternatively, the grid locations may be irregularly spaced-apart from each other. Adjacent grid locations may be spaced by 5-10 feet, for example. Each grid location may be defined by a corresponding set of location parameters, e.g., X and Y locations parameters. In the ensuing description, each grid location may also be referred to as an "XY grid locations" or an "XY spot."

At 502*b*, the APs and UWB anchors connect, and identify themselves, to location server 190. At 502*c*, location server 190 accesses existing statistical information for all supported non-UWB location technologies (e.g., WiFi and BLE location technologies) based on aggregate/generic calibration data collected with respect to all know venues, which do not include the present venue. The existing statistical information may relate to non-UWB location technologies, such as WiFi RSSI, WiFi AoA, BLE RSSI, BLE AoA, and so on, for example.

At 502*d*, location server 190 enables non-UWB location services (e.g., WiFi and BLE location services) and UWB location services with respect to the venue. The venue is set to "uncalibrated." While calibration information (e.g., RSSI fingerprinting, multipath, obstacles and specific error variance) for the non-UWB technologies in the venue have not yet been determined, location server 190 may temporarily use the aggregate/generic calibration data for the non-UWB location technologies.

Calibration record collection operations 504*a*-504*c* are now described. At 504*a*, over time, many individuals carrying respective mobile devices enter and move through the venue. As the mobile devices move through the venue, their locations pass by/coincide with many of the grid locations across the venue at various times. The mobile devices may employ different wireless technologies. Some of the mobile devices employ UWB wireless technology, while almost all of the mobile devices employ non-UWB (e.g., WiFi and BLE) wireless technologies. Control device 180 onboards the mobile devices, e.g., provisions the mobile devices with information to enable the mobile devices to access various networks associated with the venue and control device 180.

At 504(*b*), the APs and UWB anchors communicate with the mobile devices using non-UWB (e.g., WiFi and BLE) and UWB wireless transmissions. At scheduled intervals, the mobile devices engage in calibration sessions or exchanges, e.g., TDoA, TWR, and FTM RTT, exchanges, with the APs and the UWB anchors using the UWB, WiFi, and BLE technologies. The APs and UWB anchors make location measurements, e.g., RSSI, AoA, and FTM RTT measurements, for the various location technologies during the calibration exchanges. In addition to regularly scheduled TWR sessions for location, calibration exchanges may be scheduled to include multiple TWR exchanges. During each calibration exchange:

a. TWR and ranging values may be checked to identify high-accuracy measurements, using (i) a ratio of non-line-of-sight (NLOS) to line-of-sight (LOS) measurements for UWB location measurements in the calibration exchange, and/or (ii) variance of ranging values across the UWB location measurements.

b. The calibration exchanges may be trimmed of UWB (TWR) location measurements that are NLOS or have high variance. The remaining UWB location measurements are saved to attempt to match or pair the UWB location measurements to WiFi and BLE location measurements (as described below).

The calibration exchanges may be coordinated in time to increase the likelihood that WiFi, BLE, and UWB calibration exchanges (and thus the location measurements made during the calibration exchanges) will align or coincide with each other in time. For example, a light clock sync may be performed across the WiFi, BLE and UWB radios of the mobile devices, the APs, and the UWB anchors, and scheduling of UWB and WiFi TWR and FTM RTT exchanges are aligned in time as much as possible with BLE chirps. If FTM RTT is not supported on a given WiFi mobile device, simple block ack request (BAR)/block ack (BA) exchanges may be performed to get achieve WiFi calibration exchanges (to capture WiFi AoA and RSSI measurements, for example).

A key reason to perform location calibration for non-UWB location technologies (e.g., WiFi and BLE location technologies) is to provide decent coverage hole assistance to the UWB location technology. If UWB transmissions are unable to reach the coverage holes for the location calibration, then there will be similar regions where location accuracy suffers for WiFi and BLE location technologies due to a lack of calibration. To avoid this issue:

a. UWB location calibration TWR exchanges may be performed with an increased number of symbols in a transmission preamble and a start frame delimiter (SFD) to improve timing accuracy and coverage area. The same goal can also be achieved using the lowest data rate in data symbol transmissions.

b. Alternatively, the adjustments listed in (a) may be performed only for mobile devices that are currently in a coverage hole (instead of for all calibration exchanges).

During the calibration exchanges, the APs and anchors make/collect (i) UWB measurements for UWB location technologies based on UWB transmissions from the mobile devices, and (ii) non-UWB measurements for non-UWB location technologies (e.g., WiFi and BLE) based on the non-UWB transmissions from the mobile devices. The APs and the UWB anchors use their local clocks to timestamp the non-UWB location measurements and the UWB location measurements with respective timestamps. The APs and UWB anchors send to location server 190 location measurement information, e.g., location measurement packets, that include the non-UWB and UWB location measurements, their respective timestamps, AP/UWB anchor identifiers of the sending APs and UWB anchors, and mobile device identifiers for the mobile devices to which the location measurements pertain.

At 504(c), location server 190 creates location calibration records (also referred to simply as "calibration records") for the grid locations of the venue, and store the records in the location database. To create the calibration records, location server 190 (i) associates the non-UWB measurements for the non-UWB location technologies with the grid locations, using the UWB measurements as reference measurements (as described below), and (ii) populates the calibration records for the grid locations with the non-UWB measurements associated with the grid locations.

To associate non-UWB location measurements with a grid location based on UWB location measurements, location server 190 may use the following operations. First, using timestamps, location server 190 associates/pairs the non-UWB measurements with particular non-UWB measurements that are collected within a predetermined time window (e.g. N milliseconds (ms)) of the particular non-UWB measurements. Second, location server 190 computes a particular UWB location (i.e., UWB location of a mobile device) based on the particular UWB location measurements, and associates the particular UWB location (and thus the particular UWB location measurements used to compute the particular UWB location) with a grid location that is within a predetermined distance of the particular UWB location. Third, through indirect association, the non-UWB location measurements associated with the particular UWB location measurements (in time) may be associated with the gird location. In this way, the particular UWB location serves as a ground truth that ties the non-UWB location measurements to the grid location and to the calibration records for the grid location. Location server 190 may repeat the aforementioned operations across most or all of the gird locations of the venue.

An example calibration record for a given grid location (e.g., XY spot) in the venue may include a tuple of the form <non-UWB location technology, XY spot, AP identifier, non-UWB location measurement>, e.g., <WiFi RSSI, XY= (44, 54), AP1, −12.6 dBm>.

Over time, location server 190 generates a statistically sufficient number of calibration records <non-UWB location technology, XY spot, AP identifier, non-UWB location measurement> to calibrate each non-UWB location technology at the XY spot in the venue.

Now described are venue calibration operations 506a-506c that use the collected calibration records to calibrate the non-UWB location technologies in the venue. Generally, location server 190 may perform different types of calibration in the venue, including, but not limited to RSSI calibration, multipath calibration, obstacle identification, per-technology characterization, and per-mobile device calibration. For the most part, the different types of calibration rely on statistical parameters derived from the calibration records, as described below.

At 506a, location server 190 computes/estimates the statistical parameters (also referred to as "calibration sets") based on the non-UWB location measurements for each of the non-UWB location technologies at each of the grid locations (e.g., each XY spot) in the venue, as stored in the calibration records for each of the grid locations. The statistical parameters may include, but are not limited to, a respective variance and a respective bias of the non-UWB location measurements for each non-UWB location technology at each grid location. The respective variance and the respective bias collectively represent a respective calibration set for each non-UWB technology at each grid location. For example, at the given XY spot, the statistical parameters may include: for WiFi, WiFi RSSI variance/bias, WiFi FTM RTT variance/bias, WiFi AoA variance/bias, WiFi AoA multipath sources, and so on; and, for BLE, BLE RSSI variance/bias, BLE FTM RTT variance/bias, BLE AoA variance/bias, BLE AoA multipath sources, and so on.

RSSI calibration is briefly discussed, first. RSSI location is based on a model of pathloss. The components of the model include, for example, 1 meter intersect pathloss, pathloss exponents (i.e., how fast the pathloss increases as distance increases), and breakpoints (i.e., distances at which the pathloss exponent changes). The components are usually set based on profiles of the type of deployment (carpeted office, outdoor, etc.). The components are subject to significant error in the approximation of any actual deployment, which leads to reduced accuracy. In contrast, RSSI fingerprinting specifically measures the actual pathloss at each XY spot in the venue, to replace the approximate model used in RSSI location with a perfect fit. Establishing RSSI fingerprinting requires substantial, time consuming, manual legwork to make the pathloss measurements.

The embodiments presented herein extract pathloss from WiFi and BLE calibration records at XY spots in the venue that are indicated by UWB locations. Over many mobile devices that pass through the venue, the most trafficked areas collect enough of the calibration records that a statistical distribution for pathloss at each XY spot may be derived from the calibration records. The statistical distribution may include a mean and a variance pathloss for each XY spot to each AP/UWB anchor within range.

Figure 6:
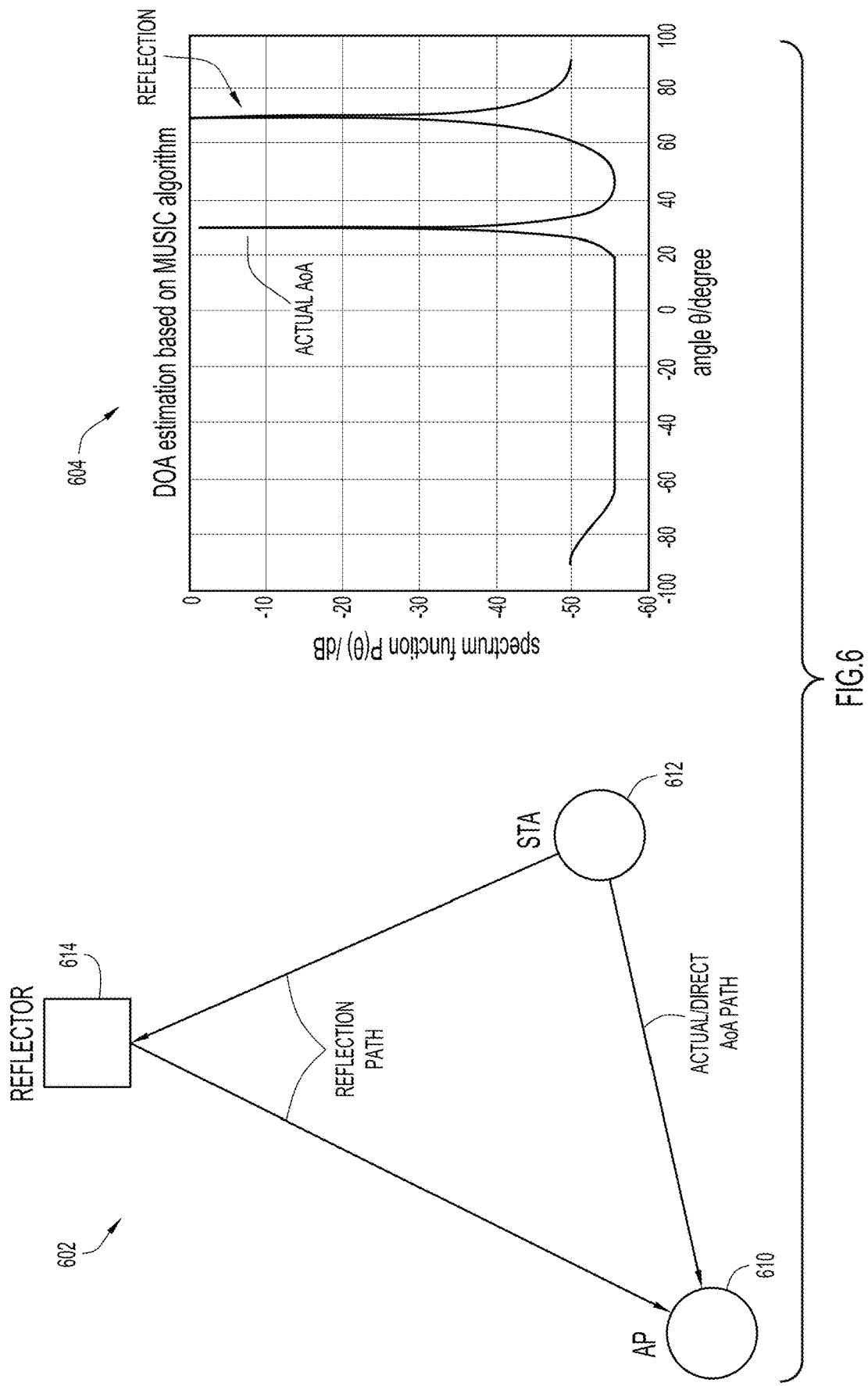
FIG. 6 is an illustration that shows a multipath scenario in a venue, and a plot of an AoA solution for the multipath scenario, according to an example embodiment.

Next, multipath calibration is discussed. For calibration records that contain WiFi or BLE AoA measurements, AoA estimation using Multiple Signal Classification (MUSIC) can provide the top N most probable AoAs. Removing the AoA that is closest to the true AoA, as determined by the UWB location and its AoA to each AP/UWB anchor, leaves the AoA due to multipath. Over the collection of many calibration records that include AoA measurements, a set of reflectors that impact a typical AoA measurement for each XY spot may be pieced together. After calibration, any future AoA location solutions can examine how well each AoA measurement matches (e.g., correlates) to the true AoA and the typical multipath reflections for that XY spot. With reference to FIG. 6, there is an illustration that shows (i) on a left side of the figure, an example multipath scenario or arrangement 602 in a venue, and (ii) on the right side of the figure, an example plot 604 of a MUSIC solution for the multipath scenario. Multipath scenario 602 includes an AP 610, a mobile device (STA) 612 with an actual AoA path (i.e., a direct transmission path) to the AP, and a reflector 614 that creates a reflection (i.e., a multipath reflection path) from the mobile device to the AP.

Figure 7:
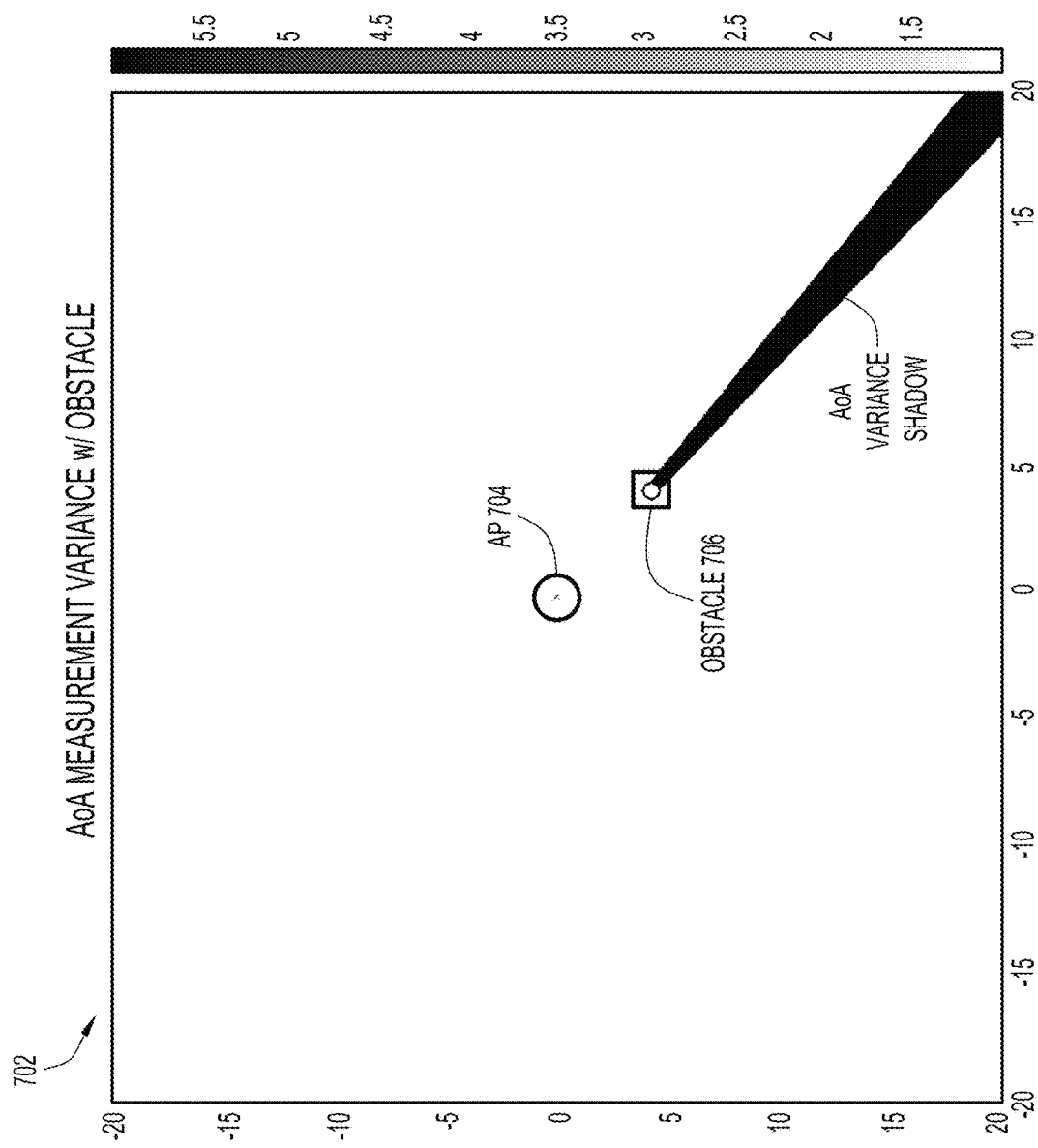
FIG. 7 is a plot of AoA variance that shows shadowing of an access point by an obstacle, according to an example embodiment.

Next, obstacle identification is discussed. Calibration can expose features of the venue that can be used in refining/filtering the location solution for a mobile device. For example, obstacles (e.g. pillars, metal walls, etc.) can produce certain patterns in measurement error variance that reveal their presence and can be used later to (ii) auto represent the obstacles on a map of the venue, and (ii) create an exclusion zone when appropriate. With reference to FIG. 7, there is an example plot 702 of AoA measurement variance that shows an increased variance that results from shadowing of an AP 704 by an obstacle 706. Similar behavior occurs for RSSI measurements, except that the shadowing does not extend infinitely behind the obstacle. The increased variance directly behind the actual location of an unknown obstacle (e.g., obstacle 706) implies the presence of that obstacle.

Next, per-technology characterization is discussed. The calibration records expose the expected variance for any given non-UWB location technology, as described above. The variance of the distribution of the various non-UWB location technologies provides a way to combine location measurements across location technologies. For example, the bias computed for a given non-UWB location technology represents a consistent, erroneous, offset in all location solutions that are based on the non-UWB location technology. Thus the offset should be removed from a given location solution based on the non-UWB location technology, to produce an improved final solution for the non-UWB location solution. On the other hand, the variance computed for a non-UWB location technology measures the reliability of location solutions that are based on the non-UWB location technology. In a case where location solutions from different non-UWB location technologies (e.g., WiFi RSSI and BLE RSSI, and WiFi AoA and BLE AoA) are combined into a final location solution, the contributions from the different non-UWB location technologies may be weighted according to their respective variances. For example, the lower the variance, the higher the weight that is applied, and vice versa.

Next, per-device characterization is discussed. While the calibrations mentioned above can be aggregated across all mobile devices to create a single snapshot of a specific XY spot at a venue, there are many aspects of location that are specific to the mobile device and independent of XY spot. After a venue has been sufficiently calibrated, further per-device calibration can be performed, e.g., for the L most popular types of mobile devices, to provide better location services. For example, from the calibration records, a comparison may be made between the variance seen at an XY spot across all mobile devices and a specific mobile device being characterized. This comparison exposes how well a mobile device is performing at each location technology relative to the global body of mobile devices that have been seen in the venue. If a particular mobile device is performing worse at a given location technology, the variance initially computed may be increased/decreased to better match the mobile device under examination.

Returning to FIG. 5, at 506b, once location server 190 computes calibration sets (e.g., variances and biases) for a given non-UWB location technology for at least a predetermined number of grid locations (e.g., more than half of the grid locations), location server 190 declares the venue calibrated for that non-UWB location technology.

At 506c, location server 190 may identify obstacles in the venue based on the calibration sets, as described above in connection with FIG. 7. For example, an obstacle may be revealed as "spikes" in variance and bias, which are used by location server 190 to snap to routes or exclusion zones. Location server 190 may also identify multipath reflectors in the venue based on the calibration sets, as described above in connection with FIG. 6.

Operations 508a and 508b that use the calibration data/sets for location solutions, and update the calibration sets over time, are now described. At 508a, once non-UWB location technologies are declared calibrated, location server 190 computes location solutions for mobile devices at or near XY spots using the non-UWB location technologies, based on the calibration sets established for the non-UWB technologies at the XY spots. At 508b, location server 190 continues to collect new non-UWB and UWB location measurements, and uses the new location measurements to update the calibration sets over time. For example, location server 190 repeats operations 504a-504c and 506a-506c to update the variances and biases computed previously based on the new location measurements. In addition, location server 190 incorporates the calibration sets for the venue into the generic/aggregated calibration sets for all venues. In addition, location server 190 may track how each of the above-mentioned statistical parameters (e.g., the error biases/variances/covariances) change periodically over time at/per XY spot.

Examples of the above-described operations for (i) calibration record collection in a venue, (ii) computation of statistical parameters/calibration sets for the venue, and (iii) use of the calibration sets for post-calibration location solutions for mobile devices in the venue are described below.

A first example is directed to WiFi RSSI and BLE RSSI location technologies. The example assumes:

a. At a time t0, a UWB location estimate (x=44, y=256) for a mobile device dl (e.g., an iPhone11) is made. This is referred to as a groundTruthXy location for the mobile device. If the groundTruthXy is within a predetermined distance (e.g., 4 feet) of an actual XY spot of the venue (i.e., coincides positionally with the XY spot), the groundTruthXy is associated with/snapped to that XY spot.

b. At time t1=t0+/−T, where T is within the predetermined time window mentioned above in connection with operation 504c, WiFi/BLE RSSI estimates/measurements are made by APs AP0, AP1, and AP2. In an example, T may be a coherence time between the location measurements for the different location technologies, and may be in a range of 10-100 ms, for example.

c. Time t0=Monday, Jan. 1, 2020 at 0:0:0.0, and t1=Monday, Jan. 1, 2020 at 0:0:0.1.

Based on the above assumptions and conditions, for WiFi RSSI, the following calibration records are generated:

a. cal_record1:
 apId: AP0.
 wirelessTech: WiFi.
 locationTech: RSSI.
 locationMeasurement: −60 dBm.
 groundTruthXy: <44,256>. The WiFi RSSI measurement coincides in time with the UWB location measurements from which the groundTruthXy was derived, and thus is tied to the same XY spot that coincides positionally with the groundTruthXy.
 timestamp: Monday, Jan. 1, 2020 at 0:0:0.1.
 deviceType: iPhone11.

b. cal_record2:
 apId: AP1.
 wirelessTech: WiFi.
 locationTech: RSSI.
 locationMeasurement: −40 dBm.
 groundTruthXy: <44,256>.
 timestamp: Monday, Jan. 1, 2020 at 0:0:0.1.
 deviceType: iPhone11.

c. cal_record3:
 apId: AP2.
 wirelessTech: WiFi.
 locationTech: RSSI.
 locationMeasurement: −70 dBm.
 groundTruthXy: <44,256>.
 timestamp: Monday, Jan. 1, 2020 at 0:0:0.1.
 deviceType: iPhone11.

For BLE RSSI, the AP0 calibration record includes:

a. cal_record1:
 apId: AP0.
 wirelessTech: BLE.
 locationTech: RSSI.
 locationMeasurement: −68 dBm.
 groundTruthXy: <44,256>.
 timestamp: Monday, Jan. 1, 2020 at 0:0:0.1.
 deviceType: iPhone11.

Location server 190 collects a larger number of the location measurements, and generates a correspondingly large number of calibration records similar to those listed above based on the location measurements. Once a statistically significant number of calibration records for a given AP and XY spot have been generated, location server 190 identifies/accesses all of the calibration records with a groundTruthXy that coincide with the XY spot. Location server 190 performs statistical analysis on the full set of RSSI measurements/estimates from the calibration records for the XY spot. For example, location server 190 may compare the RSSI estimates to an expected RSSI given a pathloss model used for computing location based on RSSI, and generates statistical parameters (i.e., the calibration sets mentioned above) based on the comparison.

The following is an example pathloss model for expected RSSI:

$$\text{RSSI\_expected}(XY, AP0) = -40 - 3.5 * \log 10(\text{distApToXy}),$$

Where
 XY is the XY spot that is being evaluated/calibrated, which includes all data collected for groundTruthXy that is within the predetermined distance of the XY spot,
and
 distApToXy is the distance in meters from AP0 to that XY spot.

From the expected RSSI and the large set of RSSI measurements, location server 190 computes/estimates bias and variance, for example, for the WiFi RSSI location technology at the XY spot, according to the following example equations:

$$\text{BiasRssiWiFi}(XY, AP0) = \text{mean}(\text{RSSIestimates}(XY, AP0) - \text{RSSI\_expected}(XY, AP0)).$$

$$\text{VarianceRssiWifi}(XY, AP0) = \text{variance}(\text{RSSIestimates}(XY, AP0)).$$

Location server 190 similarly computes biases for AP1, AP2, and any other APs that are within a predetermined distance of the XY spot and that are able to attain location measurements from that XY spot. The above-described process continues/repeats to gather similar calibration records for all grid locations (XY spots) and their nearby APs.

Once calibration sets (e.g., biases and variances) for most or all of the XY spots in the venue have been computed, location server 190 may update the pathloss model to minimize an overall bias. For example, assume an initial pathloss model, e.g., −40−3.5*log 10(distApToXy), which may represent either an average pathloss observed across many venues, or a default pathloss model. Then, location server 190 determines an updated pathloss model, e.g., −44−3.2*log 10(distApToXy), that fits the location measurements/calibration sets better than the initial pathloss model. In other words, location server 190 updates the initial pathloss model to the updated pathloss model, and also updates all the biases to reflect the change, because the biases were previously calculated with a different pathloss model, i.e., the initial pathloss model.

Once the venue has been calibrated as described above, location server 190 computes location estimates for mobile devices in the venue based on the calibration, e.g., based on the calibration sets for the grid locations of the venue. For example, assume WiFi RSSI measurements RSSI0, RSSI1, and RSSI2 at AP0, AP1, and AP2, respectively, based on transmissions from a mobile device. Location server 190 may create a probability heatmap of the location of the mobile device based on the updated pathloss model and biases. The probability heatmap represents the probability that the mobile device is located at any XY spot in the venue. The location of the mobile device may be determined based on the following example series of equations:

$$\text{ErrRssi}(AP0,XY) = \text{abs}(\text{RSSI0} + \text{BiasRssiWifi}(XY,AP0) - \text{RSSI\_expected}(XY,AP0))^2.$$

$$\text{sumErr}(XY) = \text{ErrRssi}(AP0,XY)/\text{VarianceRssiWifi}(XY, AP0) + \text{ErrRssi}(AP1,XY)/\text{VarianceRssiWifi}(XY, AP1) + \text{ErrRssi}(AP2,XY)/\text{VarianceRssiWifi}(XY, AP2).$$

$$\text{Probability } P(XY) = \exp(-\text{sumErr}(XY)/\text{sigma}).$$

The RSSI location solution may be chosen to be the XY that is associated with the highest Probability P. Alternatively, the RSSI location solution may be a centroid solution $XY = P \cdot XY/\text{sum}(P)$.

The next example is directed to WiFi AoA, which is similar to BLE AoA. The WiFi AoA is also similar to WiFi RSSI described above, except for the following differences. First, AoA estimates/measurements are saved in the calibration records instead of RSSI measurements. Second, an expected AoA represents an angle between an XY spot and an AP. Third, there is no pathloss model for translating location measurements to expected location measurements. Rather, the expected measurements are simply the angles between the AP and the mobile device.

For WiFi AoA, an example calibration record includes:
a. cal_record1:
   apId: AP0.
   wirelessTech: WiFi.
   locationTech: AoA.
   locationMeasurement: 90 degrees.
   groundTruthXy: <0,30>.
   timestamp: Monday, Jan. 1, 2020 at 0:0:0.1.
   deviceType: iPhone11.

The following equations may be used estimate bias and variance with respect to WiFi AoA across a statistically significant number of WiFi AoA calibration records:

$$\text{AoA\_expected}(XY,AP0) = a\tan 2(Y-AP0y, X-AP0x).$$

$$\text{BiasAoAWifi}(XY,AP0) = \text{mean}(\text{AoAEstimates}(:,XY, AP0) - \text{AoA\_expected}(XY,AP0)).$$

$$\text{VarianceAoAWifi}(XY,AP0) = \text{variance}(\text{AoAEstimates}(:, XY,AP0)).$$

The next example is directed to WiFi Ranging. BLE Ranging is similar to WiFi Ranging. The WiFi Ranging example is also similar to the WiFi RSSI example above, but focuses on ranging estimates and expected ranging, which represents an actual distance between an XY spot and an AP. Also, WiFi Ranging does not employ a pathloss model to translate measurements into expected measurements. Rather, expected measurements are simply the distance between the AP and the mobile device to which the ranging pertains.

For WiFi Ranging, an example calibration record includes:
a. cal_record1:
   apId: AP0.
   wirelessTech: WiFi.
   locationTech: ranging.
   locationMeasurement: 10.3 ft.
   groundTruthXy: <0,30>.
   timestamp: Monday, Jan. 1, 2020 at 0:0:0.1.
   deviceType: iPhone11.

The following equations may be used estimate bias and variance with respect to WiFi Ranging across a statistically significant number of WiFi Ranging calibration records:

$$\text{range\_expected}(XY,AP0) = \text{sqrt}((Y-AP0y)-2+(X-AP0x)^2).$$

$$\text{BiasRangingWifi}(XY,AP0) = \text{mean}(\text{rangeEstimates}(:, XY,AP0) - \text{range\_expected}(XY,AP0)).$$

$$\text{VarianceRangingWifi}(XY,AP0) = \text{variance}(\text{rangeEstimates}(:,XY,AP0)).$$

Figure 8:
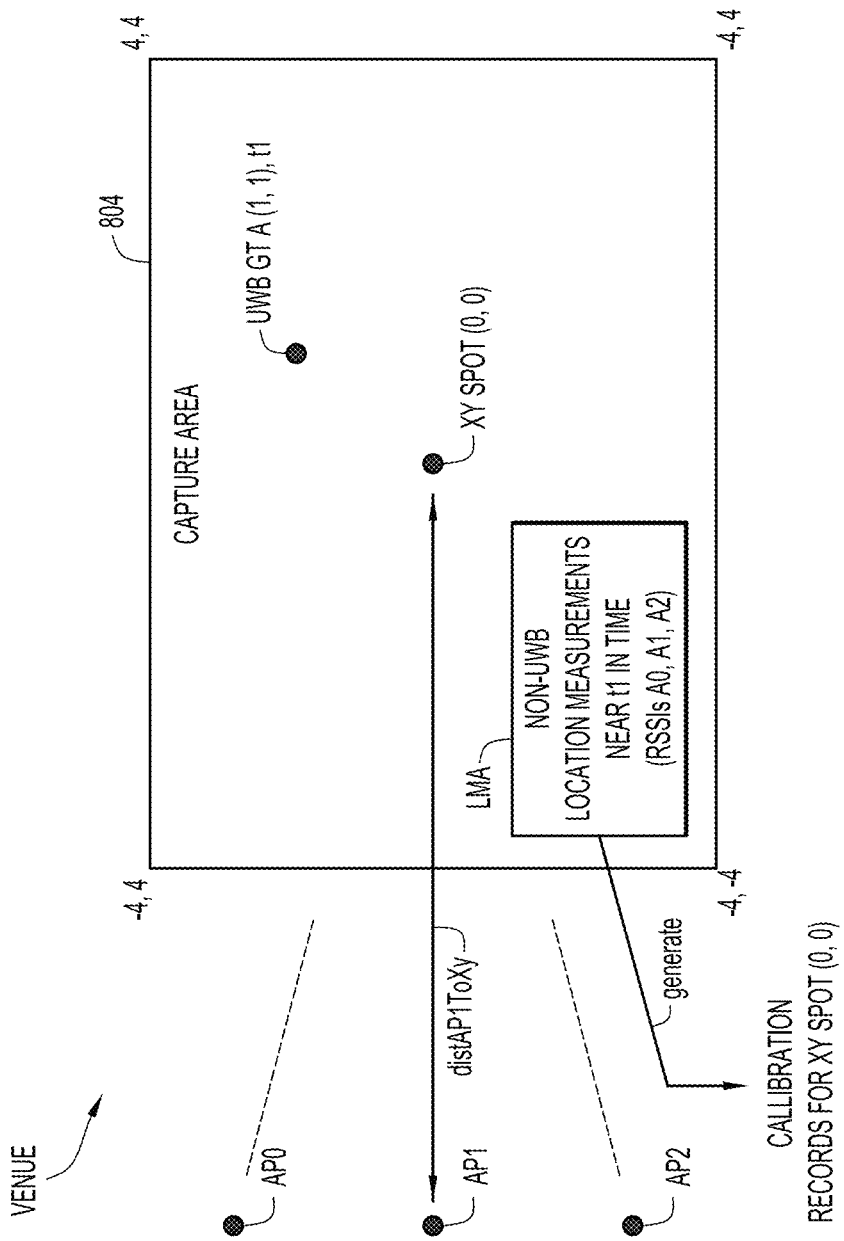
FIG. 8 is an illustration of associating UWB ground truth locations with a grid location of a venue, and with non-UWB location measurements in corresponding calibration records for the grid location, according to an example embodiment.

With reference to FIG. 8, there is shown an example illustration of associating UWB groundTruthXy (GT) <x,y> locations with an XY spot (i.e., grid location) of a venue, and with non-UWB location measurements in corresponding calibration records for the XY spot. Only a small portion of the venue that includes the XY spot is shown in FIG. 8. In the example, UWB GT A (e.g., UWB GT (1, 1)) corresponds to time t1, e.g., is derived based on UWB location measurements captured at time t1. Also, UWB GT A is within a predetermined distance (e.g., =1-4 feet) of an XY spot (0,0), where the predetermined distance is shown as a capture area 804 surrounding XY spot (0,0). In this way, UWB GT A coincides positionally with XY spot (0,0), and thus is tied or snapped to (i.e., associated with) that XY spot for purposes of generating calibration records for that XY spot.

Non-UWB location measurements LM A (e.g., RSSI measurements) are captured by APs AP0, AP1, and AP3 within a predetermined time window of time t1, i.e., coincide in time with UWB GT A. AP1 is shown separated from XY spot (0,0) by a distance="distAp1ToXy" used in the equation for expected RSSI introduced above. The time proximity between non-UWB location measurements LM A and UWB GT A ties/associates the non-UWB location measurements LM A to/with the UWB GT A, and thus to XY spot (0,0). Accordingly, non-UWB location measurements LM A are stored in calibration records for XY spot (0,0).

Figure 9:
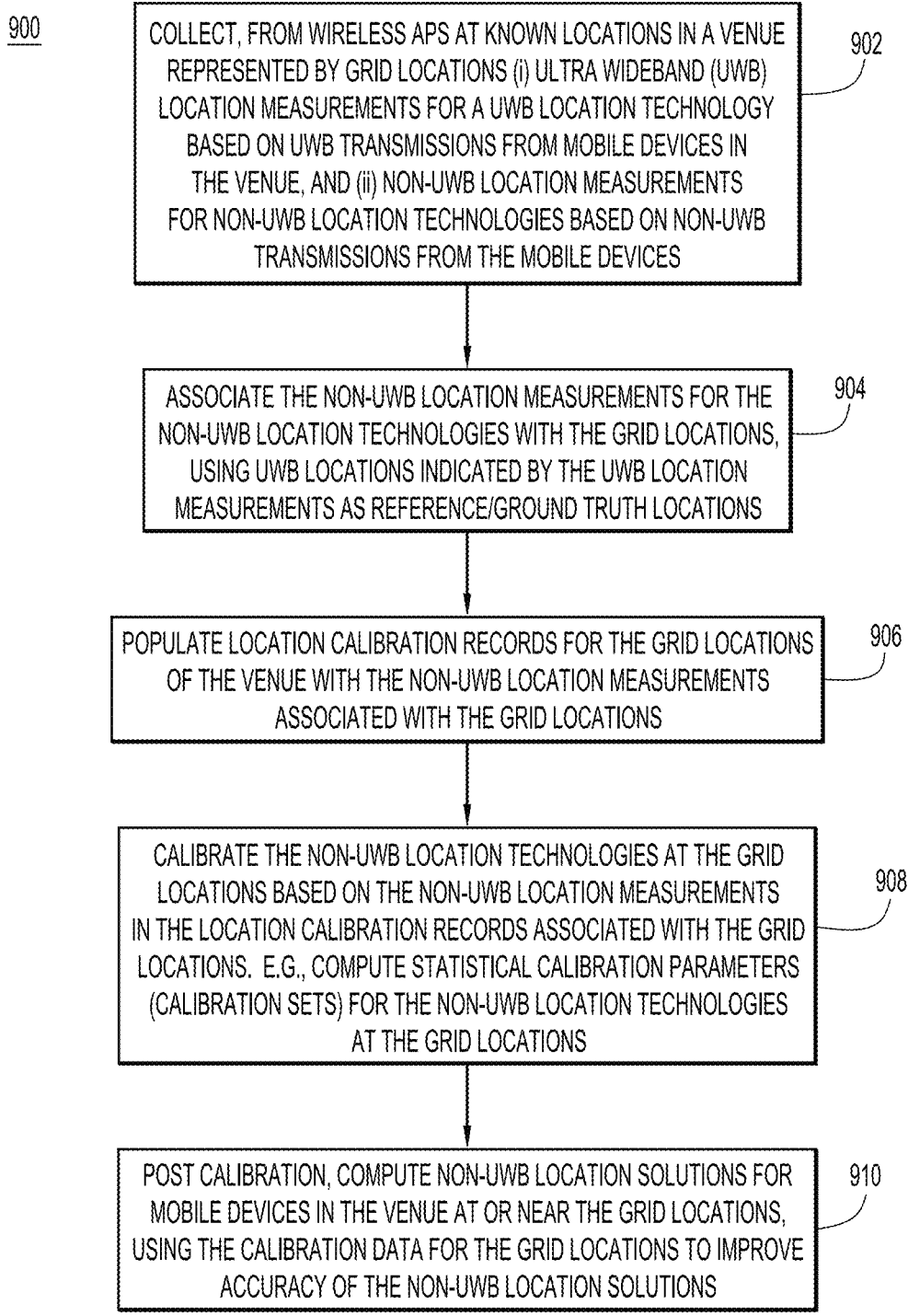
FIG. 9 is a flowchart of a summary method of automatically calibrating non-UWB location technologies at grid location in a venue using a UWB location technology, according to an example embodiment.

With reference to FIG. 9, there is a flowchart of an example summary method 900 of automatically calibrating non-UWB location technologies at grid location in a venue. Method 900 includes various operations described above. Method 900 may be performed primarily by location server 190.

At 902, location server 190 collects, from wireless APs (and UWB anchors) at known locations in the venue that is represented by grid locations (e.g., XY spots) defined by information accessible to the location server, (i) ultra wideband (UWB) location measurements for a UWB location technology based on UWB (wireless) transmissions from mobile devices in the venue, and (ii) non-UWB location measurements for non-UWB location technologies based on non-UWB (wireless) transmissions from the mobile devices.

At 904, location server 190 associates the non-UWB location measurements for the non-UWB location technologies with the grid locations, using UWB locations derived from the UWB location measurements as reference measurements/ground truth locations. To do this, location server (i) computes mobile device locations that coincide positionally with the grid locations based on the UWB location measurements, and (ii) associates the non-UWB location measurements, that coincide in time with the UWB location measurements used in computing the mobile device locations, with the grid locations.

At 906, location server 190 populates location calibration records for the grid locations of the venue with the non- UWB location measurements associated with the grid locations. Each location calibration record may include, for example, an identifier of a non-UWB location technology, a grid location to which the location calibration record pertains, a non-UWB location measurement for the non-UWB location technology, an identifier of an AP from which the non-UWB location measurement was collected, an identifier of a mobile device to which the non-UWB location measurements pertain, and a ground truth location based on a UWB location.

At 908, location server 190 calibrates the non-UWB location technologies at the grid locations based on the non-UWB location measurements in the location calibration records associated with the grid locations. For example, location server may compute statistical calibration parameters (also referred to as "calibration sets") for the non-UWB location technologies at the grid locations based on the non-UWB location measurements of the non-UWB location technologies in the location calibration records associated with the grid locations. More specifically, location server may compute a respective statistical variance (and covariance) and a respective statistical bias for each of the non-UWB location technologies at each grid location based on the non-UWB location measurements for each of the non-UWB location technologies in the location calibration records associated with each grid location. Additionally, location server 190 may update an initial statistical pathloss model at the grid locations using the statistical calibration parameters (the calibration sets), to produce an updated statistical pathloss model.

The calibration at 908 produces calibration data or sets for the grid locations. At 910, after the calibration has been completed, location server 190 computes non-UWB location solutions for mobile devices in the venue at or near the grid locations based on non-UWB location technologies, using the calibration sets/data for the grid locations to improve accuracy of the non-UWB location solutions relative to not using the calibration data.

Figure 10:
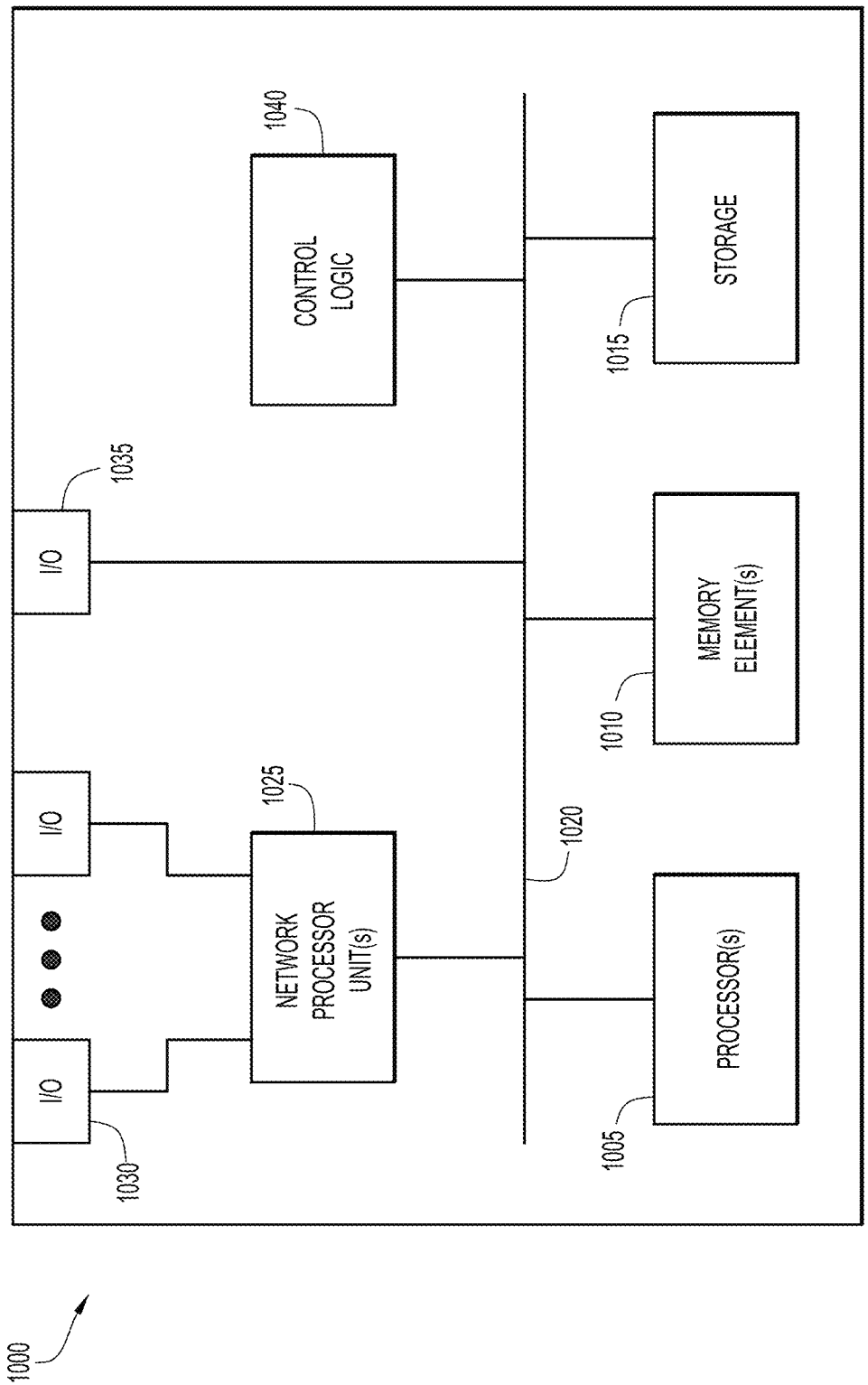
FIG. 10 is a block diagram of a computing device configured to perform operations associated with embodiments described herein, according to an example embodiment.

Referring to FIG. 10, FIG. 10 illustrates a hardware block diagram of a computing device 1000 that may perform functions associated with operations discussed herein in connection with the techniques depicted in FIGS. 1-9. In various embodiments, a computing device, such as computing device 1000 or any combination of computing devices 1000, may be configured as any entity/entities as discussed for the techniques depicted in connection with FIGS. 1-9, such as controller 185 or location server 190 shown in FIG. 1, in order to perform operations of the various techniques discussed herein.

In at least one embodiment, the computing device 1000 may include one or more processor(s) 1005, one or more memory element(s) 1010, storage 1015, a bus 1020, one or more network processor unit(s) 1025 interconnected with one or more network input/output (I/O) interface(s) 1030, one or more I/O interface(s) 1035, and control logic 1040. In various embodiments, instructions associated with logic for computing device 1000 can overlap in any manner and are not limited to the specific allocation of instructions and/or operations described herein.

In at least one embodiment, processor(s) 1005 is/are at least one hardware processor configured to execute various tasks, operations and/or functions for computing device 1000 as described herein according to software and/or instructions configured for computing device 1000. Processor(s) 1005 (e.g., a hardware processor) can execute any type of instructions associated with data to achieve the operations detailed herein. In one example, processor(s) 1005 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1010 and/or storage 1015 is/are configured to store data, information, software, and/or instructions associated with computing device 1000, and/or logic configured for memory element(s) 1010 and/or storage 1015. For example, any logic described herein (e.g., control logic 1040) can, in various embodiments, be stored for computing device 1000 using any combination of memory element(s) 1010 and/or storage 1015. Note that in some embodiments, storage 1015 can be consolidated with memory element(s) 1010 (or vice versa), or can overlap/exist in any other suitable manner.

In at least one embodiment, bus 1020 can be configured as an interface that enables one or more elements of computing device 1000 to communicate in order to exchange information and/or data. Bus 1020 can be implemented with any architecture designed for passing control, data and/or information between processors, memory elements/storage, peripheral devices, and/or any other hardware and/or software components that may be configured for computing device 1000. In at least one embodiment, bus 1020 may be implemented as a fast kernel-hosted interconnect, potentially using shared memory between processes (e.g., logic), which can enable efficient communication paths between the processes.

In various embodiments, network processor unit(s) 1025 may enable communication between computing device 1000 and other systems, entities, etc., via network I/O interface(s) 1030 to facilitate operations discussed for various embodiments described herein. In various embodiments, network processor unit(s) 1025 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1030 can be configured as one or more Ethernet port(s), Fibre Channel ports, and/or any other I/O port(s) now known or hereafter developed. Thus, the network processor unit(s) 1025 and/or network I/O interface(s) 1030 may include suitable interfaces for receiving, transmitting, and/or otherwise communicating data and/or information in a network environment.

I/O interface(s) 1035 allow for input and output of data and/or information with other entities that may be connected to computer device 1000. For example, I/O interface(s) 1035 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1040 can include instructions that, when executed, cause processor(s) 1005 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1040) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), ASIC, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1010 and/or storage 1015 can store data, software, code, instructions (e.g., processor instructions), logic, parameters, combinations thereof, and/or the like used for operations described herein. This includes memory element(s) 1010 and/or storage 1015 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 1002.11 (e.g., Wi-Fi/Wi-Fi6®), IEEE 1002.16 (e.g., Worldwide Interoperability for Microwave Access (WiMAX)), Radio-Frequency Identification (RFID), Near Field Communication (NFC), Bluetooth, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, embodiments presented herein augment the location accuracy of mid-to-low-precision location techniques (e.g. BLE RSSI based location) by using more accurate ranging techniques on supporting devices (e.g. UWB). Once the training completes, the location of mobile devices that do not support ultra-accurate location (e.g. UWB) is improved by the learning derived from the conclusions derived from the prior combination of low and high accuracy location exchanges.

In summary, in one aspect, a method is provided comprising: at a location server, collecting, from access points at known locations in a venue that is represented by grid locations defined by parameters accessible to the location server, (i) ultra wideband (UWB) location measurements for a UWB location technology based on UWB transmissions from mobile devices in the venue, and (ii) non-UWB location measurements for non-UWB location technologies based on non-UWB transmissions from the mobile devices; associating the non-UWB location measurements for the non-UWB location technologies with the grid locations, using the UWB location measurements as reference measurements; populating location calibration records for the grid locations with the non-UWB location measurements associated with the grid locations; and calibrating the non-UWB location technologies at the grid locations based on the non-UWB location measurements in the location calibration records associated with the grid locations.

In another aspect, an apparatus is provided comprising: a network processor unit coupled to network input/output interfaces to communicate with a network; and a processor coupled to the network processor unit and configured to perform: collecting, from access points at known locations in a venue that is represented by grid locations defined by parameters accessible to the processor, (i) ultra wideband (UWB) location measurements for a UWB location technology based on UWB transmissions from mobile devices in the venue, and (ii) non-UWB location measurements for non-UWB location technologies based on non-UWB transmissions from the mobile devices; associating the non-UWB location measurements for the non-UWB location technologies with the grid locations, using the UWB location measurements as reference measurements; populating location calibration records for the grid locations with the non-UWB location measurements associated with the grid locations; and calibrating the non-UWB location technologies at the grid locations based on the non-UWB location measurements in the location calibration records associated with the grid locations.

In yet another aspect, a non-transitory computer readable medium is provided. The computer readable medium is encoded with instructions that, when executed by a processor, cause the processor to perform: collecting, from access points at known locations in a venue that is represented by grid locations defined by parameters accessible to the processor, (i) ultra wideband (UWB) location measurements for a UWB location technology based on UWB transmissions from mobile devices in the venue, and (ii) non-UWB location measurements for non-UWB location technologies based on non-UWB transmissions from the mobile devices; associating the non-UWB location measurements for the non-UWB location technologies with the grid locations, using the UWB location measurements as reference measurements; populating location calibration records for the grid locations with the non-UWB location measurements associated with the grid locations; and calibrating the non-UWB location technologies at the grid locations based on the non-UWB location measurements in the location calibration records associated with the grid locations.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    at a location server, collecting, from access points at known locations in a venue that is represented by grid locations defined by parameters accessible to the location server, (i) ultra wideband (UWB) location measurements for a UWB location technology based on UWB transmissions from mobile devices in the venue, and (ii) non-UWB location measurements for non-UWB location technologies based on non-UWB transmissions from the mobile devices;
    associating the non-UWB location measurements for the non-UWB location technologies with the grid locations, using the UWB location measurements as reference measurements;
    populating location calibration records for the grid locations with the non-UWB location measurements associated with the grid locations; and
    calibrating the non-UWB location technologies at the grid locations by computing statistical calibration parameters, including one of a statistical variance and a statistical bias, for each of the non-UWB location technologies at each grid location based on the non-UWB location measurements in the location calibration records associated with each grid location.

2. The method of claim 1, wherein the calibrating produces calibration data for the grid locations, and the method further comprises:
    computing non-UWB location solutions for ones of the mobile devices in the venue at or near the grid locations, using the calibration data for the grid locations to improve accuracy of the non-UWB location solutions relative to not using the calibration data.

3. The method of claim 1, wherein the associating includes:
    computing mobile device locations that coincide positionally with the grid locations based on the UWB location measurements; and
    associating the non-UWB location measurements, that coincide in time with the UWB location measurements used in computing the mobile device locations, with the grid locations.

4. The method of claim 1, whereinthe grid locations represent locations on a floor map of the venue.

5. The method of claim 1, wherein the computing includes:
    computing the statistical variance and the statistical bias for each of the non-UWB location technologies at each grid location.

6. The method of claim 1, wherein the calibrating further includes:
    updating an initial statistical pathloss model at the grid locations using the statistical calibration parameters, to produce an updated statistical pathloss model.

7. The method of claim 1, wherein each location calibration record includes an identifier of a non-UWB location technology, a grid location to which each location calibration record pertains, a non-UWB location measurement for the non-UWB location technology, and an identifier of an access point from which the non-UWB location measurement was collected.

8. The method of claim 1, wherein the non-UWB location technologies include a WiFi location technology and a Bluetooth location technology.

9. The method of claim 1, wherein the non-UWB location technologies are based on one or more of received signal strength indicator (RSSI) measurements and angle-of-arrival (AoA) measurements.

10. The method of claim 1, wherein the access points are each equipped with an UWB radio configured to make the UWB location measurements and one or more non-UWB radios configured make the non-UWB location measurements.

11. An apparatus comprising:
    a network processor unit coupled to network input/output interfaces to communicate with a network; and
    a processor coupled to the network processor unit and configured to perform:
        collecting, from access points at known locations in a venue that is represented by grid locations defined by parameters accessible to the processor, (i) ultra wideband (UWB) location measurements for a UWB location technology based on UWB transmissions from mobile devices in the venue, and (ii) non-UWB location measurements for non-UWB location technologies based on non-UWB transmissions from the mobile devices;
        associating the non-UWB location measurements for the non-UWB location technologies with the grid locations, using the UWB location measurements as reference measurements;
        populating location calibration records for the grid locations with the non-UWB location measurements associated with the grid locations, wherein each location calibration record includes an identifier of a non-UWB location technology, a grid location to which each location calibration record pertains, and a non-UWB location measurement for the non-UWB location technology; and
        calibrating the non-UWB location technologies at the grid locations based on the non-UWB location measurements in the location calibration records associated with the grid locations.

12. The apparatus of claim 11, wherein the calibrating produces calibration data for the grid locations, and the processor is further configured to perform:
    computing non-UWB location solutions for ones of the mobile devices in the venue at or near the grid locations, using the calibration data for the grid locations to improve accuracy of the non-UWB location solutions relative to not using the calibration data.

13. The apparatus of claim 11, wherein the processor is configured to perform the associating by:
    computing mobile device locations that coincide positionally with the grid locations based on the UWB location measurements; and associating the non-UWB location measurements, that coincide in time with the UWB location measurements used in computing the mobile device locations, with the grid locations.

14. The apparatus of claim 11, wherein the processor is configured to perform the calibrating by:
computing statistical calibration parameters for the non-UWB location technologies at the grid locations based on the non-UWB location measurements for the non-UWB location technologies in the location calibration records associated with the grid locations.

15. The apparatus of claim 14, wherein the processor is configured to perform the computing by:
computing a statistical variance and a statistical bias for each of the non-UWB location technologies at each grid location based on the non-UWB location measurements for each of the non-UWB location technologies in the location calibration records associated with each said grid location.

16. The apparatus of claim 11, wherein the non-UWB location technologies include a WiFi location technology and a Bluetooth location technology.

17. The apparatus of claim 11, wherein the non-UWB location technologies are based on one or more of received signal strength indicator (RSSI) measurements and angle-of-arrival (AoA) measurements.

18. A non-transitory computer readable medium encoded with instructions that, when executed by a processor, cause the processor to perform:
collecting, from access points at known locations in a venue that is represented by grid locations defined by parameters accessible to the processor, (i) ultra wideband (UWB) location measurements for a UWB location technology based on UWB transmissions from mobile devices in the venue, and (ii) non-UWB location measurements for non-UWB location technologies based on non-UWB transmissions from the mobile devices;

associating the non-UWB location measurements for the non-UWB location technologies with the grid locations, using the UWB location measurements as reference measurements;

populating location calibration records for the grid locations with the non-UWB location measurements associated with the grid locations; and calibrating the non-UWB location technologies at the grid locations by computing statistical calibration parameters, including one of a statistical variance and a statistical bias, for each of the non-UWB location technologies at each grid location based on the non-UWB location measurements in the location calibration records associated with each grid location.

19. The non-transitory computer readable medium of claim 18, wherein the calibrating produces calibration data for the grid locations, and the instructions further include instructions to cause the processor to perform:
computing non-UWB location solutions for ones of the mobile devices in the venue at or near the grid locations, using the calibration data for the grid locations to improve accuracy of the non-UWB location solutions relative to not using the calibration data.

20. The non-transitory computer readable medium of claim 18, wherein instructions to cause the processor to perform the associating include instructions to cause the processor to perform:
computing mobile device locations that coincide positionally with the grid locations based on the UWB location measurements; and associating the non-UWB location measurements, that coincide in time with the UWB location measurements used in computing the mobile device locations, with the grid locations.

* * * * *

UNITED STATES PATENT AND TRADEMARK OFFICE
CERTIFICATE OF CORRECTION

PATENT NO. : 11,644,525 B2
APPLICATION NO. : 17/089119
DATED : May 9, 2023
INVENTOR(S) : Matthew Aaron Silverman et al.

Page 1 of 1

It is certified that error appears in the above-identified patent and that said Letters Patent is hereby corrected as shown below:

In the Claims

Column 23, Line 61, please replace "whereinthe" with --wherein: the--

Signed and Sealed this
Twenty-seventh Day of June, 2023

Katherine Kelly Vidal
*Director of the United States Patent and Trademark Office*